United States Patent
Stenneth et al.

(10) Patent No.: US 10,759,442 B2
(45) Date of Patent: Sep. 1, 2020

(54) DANGEROUS DRIVING EVENT REPORTING

(71) Applicant: HERE Global B.V., Eindhoven (NL)

(72) Inventors: Leon Stenneth, Chicago, IL (US); Leo Modica, Wheaton, IL (US)

(73) Assignee: HERE Global B.V., Eindhoven (NL)

( * ) Notice: Subject to any disclaimer, the term of this patent is extended or adjusted under 35 U.S.C. 154(b) by 99 days.

(21) Appl. No.: 14/291,557

(22) Filed: May 30, 2014

(65) Prior Publication Data

US 2015/0344038 A1    Dec. 3, 2015

(51) Int. Cl.
  *G07C 5/08* (2006.01)
  *B60W 40/103* (2012.01)
  *B60W 40/101* (2012.01)
  *G07C 5/00* (2006.01)

(52) U.S. Cl.
  CPC ........ *B60W 40/103* (2013.01); *B60W 40/101* (2013.01); *G07C 5/008* (2013.01); *G07C 5/0808* (2013.01); *G07C 5/0816* (2013.01)

(58) Field of Classification Search
  CPC ........ G07C 5/008; G07C 5/0891; G07C 5/02; G07C 5/08; G07C 5/0841; G07C 5/0858; G01C 21/32; G01C 21/3694; G01C 21/3697; G01S 2013/9357
  See application file for complete search history.

(56) References Cited

U.S. PATENT DOCUMENTS

| | | | |
|---|---|---|---|
| 5,786,771 A * | 7/1998 | Feeney | H04L 45/00 370/388 |
| 5,907,293 A * | 5/1999 | Tognazzini | B60W 40/04 340/903 |
| 5,923,103 A * | 7/1999 | Pulizzi | H02J 3/14 307/126 |
| 6,263,282 B1 | 7/2001 | Vallancourt | |
| 6,567,851 B1 * | 5/2003 | Kobayashi | H04L 12/18 370/312 |
| 7,015,809 B1 * | 3/2006 | Sayers | H01Q 1/246 340/539.1 |
| 7,330,103 B2 | 2/2008 | Boss et al. | |

(Continued)

FOREIGN PATENT DOCUMENTS

| EP | 0419399 | 8/1990 |
|---|---|---|
| EP | 2124212 A1 | 11/2009 |

(Continued)

OTHER PUBLICATIONS

Partial European Search Report cited in EP15163613, dated Oct. 6, 2015.

(Continued)

*Primary Examiner* — Steven Lim
*Assistant Examiner* — Muhammad Adnan
(74) *Attorney, Agent, or Firm* — Alston & Bird LLP

(57) ABSTRACT

Dangerous driving events may be reported by detecting an occurrence of a dangerous event relating to the operation of a vehicle. A notification message of the dangerous event may be generated involving a time of occurrence of the dangerous event, a location of the dangerous event, and an event type of a plurality of event types for the dangerous event. The notification message may then be transmitted to communicate the occurrence dangerous driving event and information related to the dangerous driving event.

15 Claims, 8 Drawing Sheets

(56) References Cited

U.S. PATENT DOCUMENTS

| | | | |
|---|---|---|---|
| 7,352,280 B1* | 4/2008 | Rockwood | G06F 21/55 340/521 |
| 7,851,758 B1* | 12/2010 | Scanlon | G01J 5/02 250/330 |
| 8,140,358 B1* | 3/2012 | Ling | G06Q 40/08 705/4 |
| 8,249,910 B2* | 8/2012 | Wellman | G06Q 10/0639 705/7.26 |
| 8,378,849 B2 | 2/2013 | Chandra et al. | |
| 8,626,432 B2 | 1/2014 | Nishiyama et al. | |
| 8,666,590 B2* | 3/2014 | Follmer | G07C 5/0891 701/28 |
| 8,781,671 B2* | 7/2014 | Beck | B60T 13/665 340/453 |
| 8,954,226 B1* | 2/2015 | Binion | G06Q 40/08 701/33.4 |
| 9,076,340 B2* | 7/2015 | Wong | G08G 1/167 |
| 9,188,985 B1* | 11/2015 | Hobbs | G01C 21/3682 |
| 9,323,912 B2* | 4/2016 | Schultz | G06F 21/32 |
| 9,349,225 B2* | 5/2016 | Wanami | G08G 1/05 |
| 9,721,175 B2* | 8/2017 | Kursun | G06K 9/00926 |
| 9,778,842 B2* | 10/2017 | Ferren | G06K 9/00248 |
| 9,836,716 B2* | 12/2017 | Gunderson | G06Q 10/087 |
| 9,892,576 B2* | 2/2018 | Kursun | G07C 9/37 |
| 9,922,558 B2* | 3/2018 | Tanaka | G08G 1/0133 |
| 10,235,880 B2* | 3/2019 | Seo | G08G 1/0112 |
| 10,417,914 B1* | 9/2019 | Vose | G08G 1/0129 |
| 2003/0009270 A1* | 1/2003 | Breed | B60N 2/2863 701/32.4 |
| 2004/0022416 A1* | 2/2004 | Lemelson | G01S 13/931 382/104 |
| 2004/0186661 A1* | 9/2004 | Barton | G01C 21/32 701/532 |
| 2004/0225557 A1* | 11/2004 | Phelan | G07C 5/02 701/1 |
| 2004/0236596 A1* | 11/2004 | Chowdhary | G08G 1/20 705/26.1 |
| 2005/0052462 A1* | 3/2005 | Sakamoto | G01C 21/3694 345/473 |
| 2005/0065711 A1* | 3/2005 | Dahlgren | G08G 1/01 701/117 |
| 2006/0046732 A1* | 3/2006 | Grossman | G08G 1/096838 455/450 |
| 2006/0089163 A1 | 4/2006 | Khawand et al. | |
| 2006/0092043 A1* | 5/2006 | Lagassey | G07C 5/0891 340/907 |
| 2006/0095199 A1* | 5/2006 | Lagassey | B62D 41/00 701/117 |
| 2007/0076340 A1* | 4/2007 | Ewing | G06F 1/26 361/62 |
| 2007/0150140 A1* | 6/2007 | Seymour | G07C 5/085 701/33.4 |
| 2007/0268158 A1* | 11/2007 | Gunderson | G06Q 40/08 340/933 |
| 2008/0027642 A1* | 1/2008 | Winberry | G06F 16/29 701/455 |
| 2008/0227411 A1* | 9/2008 | Martinez | B60D 1/62 455/90.1 |
| 2008/0238404 A1* | 10/2008 | Ferguson | H02J 13/0006 324/76.11 |
| 2008/0255722 A1* | 10/2008 | McClellan | G07C 5/008 701/31.4 |
| 2009/0067586 A1* | 3/2009 | Fano | H04M 3/51 379/49 |
| 2009/0256698 A1 | 10/2009 | Bonilla | |
| 2010/0019932 A1 | 1/2010 | Goodwin | |
| 2010/0039247 A1* | 2/2010 | Ziegler | G07C 5/08 340/436 |
| 2010/0076670 A1* | 3/2010 | Turner | H04W 52/367 701/117 |
| 2010/0164284 A1* | 7/2010 | Lee | G06F 1/266 307/38 |
| 2010/0207751 A1* | 8/2010 | Follmer | G01C 21/32 340/439 |
| 2010/0238935 A1* | 9/2010 | Sendrowicz | H04W 40/02 370/392 |
| 2010/0324775 A1* | 12/2010 | Kermani | G07C 5/008 701/31.4 |
| 2011/0012753 A1* | 1/2011 | Shrum, Jr. | G08G 1/0112 340/902 |
| 2011/0077028 A1 | 3/2011 | Wilkes et al. | |
| 2011/0238304 A1* | 9/2011 | Kendall | G01C 21/3415 701/532 |
| 2011/0245932 A1* | 10/2011 | Schleiss | H04W 48/08 700/7 |
| 2012/0293153 A1* | 11/2012 | Garb | H02J 3/00 323/311 |
| 2012/0299713 A1 | 11/2012 | Elia et al. | |
| 2012/0326844 A1* | 12/2012 | Blaignan | G06K 19/0723 340/10.1 |
| 2013/0002399 A1* | 1/2013 | Frueh | G07C 9/257 340/5.53 |
| 2013/0015975 A1* | 1/2013 | Huennekens | A61B 5/0084 340/573.1 |
| 2013/0017421 A1* | 1/2013 | Onnerud | H01M 2/34 429/61 |
| 2013/0096731 A1* | 4/2013 | Tamari | G08G 1/0133 701/1 |
| 2013/0162168 A1* | 6/2013 | Ostrovsky | H05B 33/0815 315/287 |
| 2014/0058761 A1* | 2/2014 | Freiberger | G06Q 50/30 705/4 |
| 2014/0281568 A1* | 9/2014 | Ross | G06F 21/32 713/186 |
| 2014/0303842 A1* | 10/2014 | Boelter | B60K 35/00 701/36 |
| 2014/0337949 A1* | 11/2014 | Hoyos | G06K 9/00228 726/7 |
| 2014/0379385 A1* | 12/2014 | Duncan | G07C 5/008 705/4 |
| 2015/0046328 A1* | 2/2015 | Mitra | G06Q 20/40145 705/44 |
| 2015/0112800 A1* | 4/2015 | Binion | G06Q 30/0255 705/14.53 |
| 2015/0116114 A1* | 4/2015 | Boyles | G08B 25/00 340/539.17 |
| 2015/0121275 A1* | 4/2015 | Marshall | H04W 4/80 715/771 |
| 2015/0246654 A1* | 9/2015 | Tadic | G01P 15/02 340/436 |
| 2015/0260449 A1* | 9/2015 | Furuta | G09B 19/0092 62/125 |
| 2015/0310742 A1* | 10/2015 | Albornoz | G08G 1/096716 340/905 |
| 2016/0133131 A1* | 5/2016 | Grimm | G08G 1/096725 701/117 |
| 2016/0150070 A1* | 5/2016 | Goren | G08G 1/096775 455/404.2 |
| 2016/0364921 A1* | 12/2016 | Iyoda | G07C 5/0841 |
| 2018/0299284 A1* | 10/2018 | Wang | G08G 1/096775 |

FOREIGN PATENT DOCUMENTS

| | | |
|---|---|---|
| EP | 2 517 191 A1 | 10/2012 |
| GB | 2486384 A | 6/2012 |
| GB | 2498793 | 7/2013 |
| WO | WO9713208 | 4/1997 |
| WO | WO2011079195 | 6/2011 |
| WO | WO 2011079195 A1 * | 6/2011 |
| WO | WO2013029258 | 3/2013 |

OTHER PUBLICATIONS

European Office action for related European Application No. 15163613.1, dated Feb. 4, 2016, with English Translation.

Office Action for European Application No. 15163613.1 dated Aug. 14, 2019.

(56) References Cited

OTHER PUBLICATIONS

Vehicle-to-Vehicle Communication I Auto Safety | Consumer Reports [online] [retrieved Feb. 7, 2014]. Retrieved via the Internet: http://www.consumerReports.org/cro/magazine/2012/04/.../index.htm (dated Apr. 2012) 4 pages.

* cited by examiner

| 360 | | |
|---|---|---|
| | Timestamp: | 22:02:03 CST |
| | Location: | lat[42.232, lon[-87.222] |
| | Identification: | 0XFEABBX0 |
| | Severity[1-10]: | 9 |
| | OEM: | BM |
| Vehicle Mode 364 | | Road Attributes 365 |
| Transmission Mode: | Drive | Before Event |
| Wiper Mode: | Off | Lane ID: 12575 |
| Light Mode: | On+dim | Lane Curvature: 300m |
| Density: | 15 Vehicles within 30r | Lane Surface: Asphalt - Generic |
| | | Lane Banking: 0 degrees |
| | | During Event |
| | | lane ID: 12325 |
| | | Lane Curvature: 80m |
| | | Lane Surface: Gravel - Loose |
| | | Lane Banking: 0 degrees |
| Vehicle Dynamics 366 | | Event Characteristics 367 |
| Before Event | | Event Code: 465YRM |
| Speed: | 137kph | Event Type: Yaw Rate Mitigation |
| Yaw Rate: | 0 rad/sec | Detected By: Yaw Rate Sensor; |
| During Event | | Wheel Speed Sensor |
| Speed: | 120kph | |
| Yaw Rate: | 0.65 rad/sec | |

DANGEROUS DRIVING EVENT REPORTING

FIELD

The following disclosure relates to vehicle event reporting, and more specifically to dangerous driving event reporting.

BACKGROUND

Dangerous driving conditions exist in roadways which may affect vehicles and vehicle operators as the roadways are traveled. The dangerous driving conditions may exist as a defect or particular characteristic of the roadway itself or as a characteristic of an operator or a vehicle. For example, a particular position in a roadway may have a poorly designed curve with little banking that becomes dangerous if a road surface has deteriorated to a certain level. These dangerous driving conditions may cause or result in events impacting specific vehicles on the roadway. For example, the dangerous driving condition may cause an electronic stability system to actuate dynamic control systems of a vehicle to mitigate any dangerous vehicle movements caused by the dangerous condition.

Notifying vehicles or operators of vehicles of dangerous driving conditions, or events caused by dangerous driving conditions, can be beneficial to mitigating the overall effects of such conditions on traffic flows and safety of a roadway system. However, charting, tracking, or otherwise identifying the dangerous driving conditions, or the dynamic events which dangerous driving conditions cause, may be difficult in large roadway systems often involving thousands of miles of road paths and linkages. Further, dangerous driving events may have a wide range of causes which may each require different information to appropriately qualify the dangerous driving event so as to properly communicate any potential dangerous driving event or condition.

SUMMARY

In an embodiment, a method involves detecting an occurrence of a dangerous event relating to the operation of a vehicle. The method also involves generating a notification message of the occurrence of the dangerous event, the notification message comprising a header and a body, wherein the header comprises a time of occurrence of the dangerous event and a location of the dangerous event, and the body comprises an event type of a plurality of event types for the dangerous event. The method also involves transmitting the notification message.

In an embodiment, an apparatus involves at least one processor and at least one memory including computer program code. The at least one memory and the computer program code configured to, with the at least one processor, cause the apparatus at least to detect an occurrence of an automotive dynamic control event initiated by a dynamic control system of a vehicle. The at least one memory and the computer program code configured to, with the at least one processor, also cause the apparatus at least to generate a notification message of the automotive dynamic control event, the notification message comprising an event type for the automotive dynamic control event, a time of occurrence of the automotive dynamic control event, and a location of the automotive dynamic control event, and communicate the notification message to vehicles within a specified range of the apparatus.

In an embodiment, a non-transitory computer readable medium including instructions that when executed on a computer are operable to detect an occurrence of a dangerous event relating to the operation of a vehicle. The instructions are also operable to generate a notification message of the dangerous event comprising a time of occurrence of the dangerous event, a location of the dangerous event and an event type of a plurality of event types for the dangerous event, and transmit the notification message.

BRIEF DESCRIPTION OF THE DRAWINGS

Exemplary embodiments of the present invention are described herein with reference to the following drawings.

FIG. 3B illustrates an exemplary notification message for dangerous driving event notification.

DETAILED DESCRIPTION

Figure 1:
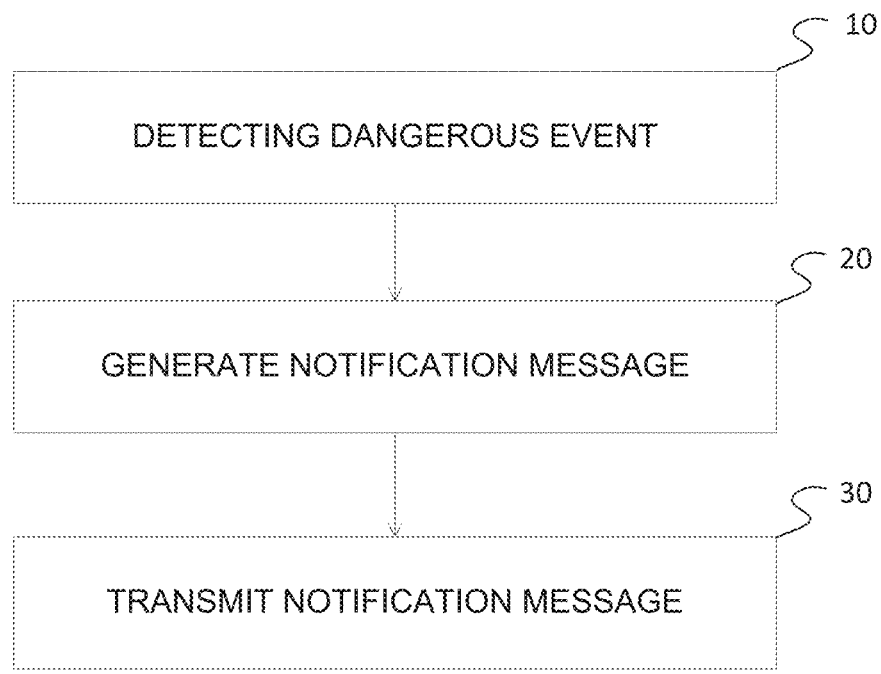
FIG. 1 illustrates a flow chart of an example embodiment for dangerous driving event notification.

Modern vehicles have many sensors such as engine sensors, brake light sensors, video sensors, dynamic movement sensors, and/or light detection and ranging (LIDAR) or other laser sensors, which collect information about the vehicle and about the vehicle's environment. The information from these sensors may be processed and analyzed in real-time to detect if a vehicle is in a dangerous driving scenario, and what mitigating action may be taken to mitigate possible negative results of the dangerous driving scenario. For example, sensor information may indicate that a vehicle has a flat tire or whether a road surface is wet, and warn a driver or implement automatic dynamic control mechanisms in response to the particular scenario. The detection of these events, which may be considered dangerous driving events, may be communicated to other vehicle operators, or a central collection facility to properly distribute the collected dangerous driving information. Detection may occur through a capture or interception of a signal from one of the vehicle sensors, or from a system configured to read and react based on data from the sensors.

In an embodiment, a detection of an occurrence of a dangerous driving event may trigger the compilation and communication of a message specifically formatted so as to appropriately communicate characteristics of the event. Specifically, the message may include a specific location of an event, a category or identification of the event, and a time the event occurred, as well as other information which may be useful in further classifying the event by a message recipient. Further, the message may be specifically formatted so as to provide specific information in a manner that may be predictable by a message recipient. For example, particular information may be presented in particular sections and locations of a message, such as a header or body section. Such a message may be useful in communicating specific dangerous driving events as well as potentially indicating a dangerous driving condition which may be the cause of the dangerous driving event.

Examples of dangerous driving events include, an activation of an electronic stability control or anti-lock braking system, applying brakes in an emergency manner (i.e. high pressure in brake system), turning windshield wipers to a high frequency mode, actuating hazard lights, switching headlights from high-beam or low-beam modes, and/or when rain sensors detect heavy rain or a transition from heavy rain to medium levels of rain.

Dangerous driving events may be correlated with vehicle dynamics and other vehicle data to determine what conditions may have contributed to the dangerous driving event. The other data may also be used to determine a severity and/or certainty of a dangerous driving condition. The other data may involve lateral acceleration, gas pedal pressure, steering angle, yaw rate, external temperature, proximity of vehicle to lane markings, braking frequency, vehicle density, or any other data that may provide information relating to the existence of a dangerous driving event. The information and data relating to the dangerous driving event may allow an identification of a dangerous driving condition. Dangerous driving conditions may involve road conditions such as surface conditions or weather conditions, environmental visibility conditions, or operator related conditions such as drowsiness, poor driving, or dangerous driving.

Further, notification messages of dangerous driving events may be useful in applications involving highly assisted vehicles or self-driving vehicles. In an embodiment, the messages may be formatted in a way that an autonomous vehicle control system may receive a notification message and access the information provided in the message to automatically adjust the control of a vehicle accordingly based on the dangerous driving message. For example, a vehicle may receive a dangerous driving notification message indicating an occurrence of a yaw rate mitigation event on a roadway 1.25 miles ahead of the vehicle. The vehicle control system may then slow the speed of the vehicle so as to mitigate any potential dangerous conditions of the roadway at that location.

Autonomous vehicles may be automated to different levels. For example, vehicles may be fully autonomous in that a system automatically controls all aspects of a vehicle's operation, partially autonomous such that a human operator is required for certain operational conditions such as heavy traffic environments, poor visibility environments, or poor weather environments, and autonomous only in the auxiliary such that systems of a vehicle only operate in certain conditions such as emergency braking, headlight adjustment, and/or windshield wiper activation. A vehicle may be configured to operate in multiple modes of autonomous operation. Also, different autonomous modes may involve different dangerous driving events and event notifications. For example, a vehicle operating in a fully autonomous mode that enacts an evasive maneuver around debris that has fallen off of a leading vehicle may report the emergency evasive maneuver in a notification message. Also, a vehicle operating in an auxiliary autonomous mode may enact an emergency braking maneuver such as an anti-lock braking event, and the anti-lock braking event may be reported in a notification message. The types of events reported may vary in different vehicle autonomous operation modes.

FIG. 1 illustrates a flow chart of an example embodiment of dangerous driving event reporting. As presented in the following sections, the acts may be performed using any combination of the components indicated in FIG. 4, FIG. 5A, FIG. 5B, or FIG. 6. For example the term controller may refer to either controller 200 or processor 300 and the following acts may be performed by mobile device 122, server 125, a vehicle 320, or a combination thereof. Additional, different, or fewer acts may be provided. The acts are performed in the order shown or other orders. The acts may also be repeated.

In act 10, a dangerous event may be detected. The dangerous event may be any event related to the operation of a vehicle or which may be considered dangerous to the safety of a vehicle operator. A detected event may be a reaction implemented by a vehicle's dynamic control system to mitigate the dangerous nature of a dangerous condition in a roadway. For example, actuation of a hydraulic braking system caused by a detection of a dangerous condition may be an event.

A dangerous event may be detected using any technique. In an embodiment, a dangerous event is detected from a response to a dangerous driving condition by a vehicle's dynamic control system, such as an Electronic Stability Control ("ESC") system. For example, the vehicle ESC system may output a code indicating an occurrence of an actuation of a dynamic control system which may be communicated to a vehicular management or communication system configured to track dynamic events. The vehicular management or communication system may be a mobile device 122 as is described below with respect to FIGS. 4, 5A, and 5B. In an embodiment, signals from vehicle sensors may be intercepted directly by the mobile device 122 and an event may be detected from those signals.

In act 20, a notification message of the dangerous event is generated. The notification message may involve data relating to the dangerous event. The notification message may be formatted so as to contain specific information in a header and/or body of the message. In an embodiment, the notification message may include a location where the dangerous event occurred as well as a description of the dangerous event. The description of the dangerous event may include an event type, category, name, and/or a code identifying the dangerous event. In an embodiment, an event type may be selected from a collection of event types. For example, event types may include wheel slip, anti-lock braking activation, yaw mitigation, traction control activation, anti-rollover activation, dense vehicle environment control, impaired visibility event, or any other event type related to the operation of a vehicle. Also, event types may use different combinations of vehicle sensors to determine an occurrence of an event. For example, referring to FIG. 5B, a wheel slip event may be determined using a wheel speed sensor 344, whereas a dense vehicle environment control event may be determined using a proximity indicator 352. Further, combinations of sensors may be used to determine events. For example, yaw mitigation event may be detected using both the wheel speed sensors 344 and a yaw rate sensor 342. The collection of event types may be assembled and/or prepared prior to the occurrence of the dangerous event. In an embodiment, the notification message may also include a time that the dangerous event occurred. Other data may also be included in the notification message that may further describe the vehicle and/or environment of the vehicle, at the time of the occurrence of the event.

In act 30, the notification message may be transmitted. The notification message may be transmitted to any recipient. In an embodiment, the notification message may be transmitted to a server as described below with respect to FIGS. 4 and 6. In an embodiment, the notification message may be transmitted to other vehicles and/or mobile devices.

The notification message may be transmitted to other vehicles and/or mobile devices directly, or the notification message may be transmitted to a server and then transmitted to the other vehicles and/or mobile devices. In an embodiment, the notification message may be transmitted to vehicles which may be affected by the dangerous driving event which the notification message is based on. For example, the dangerous driving message may be transmitted to vehicles and/or mobile devices within a certain distance or range of the location of the occurrence of the dangerous event. Further, directional travel on a road system may be taken into account and the notification message may be transmitted to vehicles and/or mobile devices traveling towards the location of the occurrence of the dangerous driving event. In an embodiment, the notification message may be transmitted to vehicles and/or mobile devices that are both traveling towards the occurrence of the dangerous event and within a certain range of the dangerous event.

The notification message may be transmitted using any technique. For example, the notification message may be transmitted using the communication interface 205 of the mobile device 122 of FIG. 5A via the network 127 of FIG. 4 to any recipient in communication with the network 127.

In an embodiment, multiple notification messages may be aggregated and analyzed to determine a dangerous event. The messages may be analyzed to determine similarities of time, type, and/or location of events, as well as similarities in any other information contained in the aggregated notification messages. For example, if a same event type, or similar event, occurs multiple times in a same location, the location may be identified as a dangerous location. Other vehicles or mobile devices may be provided information indicating that the location is a dangerous location. For example, referencing FIG. 4, the server 125 may aggregate notification messages received from multiple vehicles 320. The server 125 may determine or establish that a location is a dangerous location and send a message to other vehicles 320 notifying the vehicles 320 and/or the vehicle operators of the dangerous location.

In an embodiment, a vehicle identification may also be included in the notification message. In this embodiment, notification messages may also be aggregated and analyzed by vehicle identification. In this way, a single vehicle having multiple dangerous driving event occurrences may be identified.

Also, a vehicle type, manufacturer and/or model may be included in the notification message, and an aggregated collection of messages may be analyzed based on manufacturer and/or model to determine whether certain types of dangerous events occur more often with a particular type of vehicle, thus identifying a dangerous vehicle type manufacturer and/or model.

Figure 2:
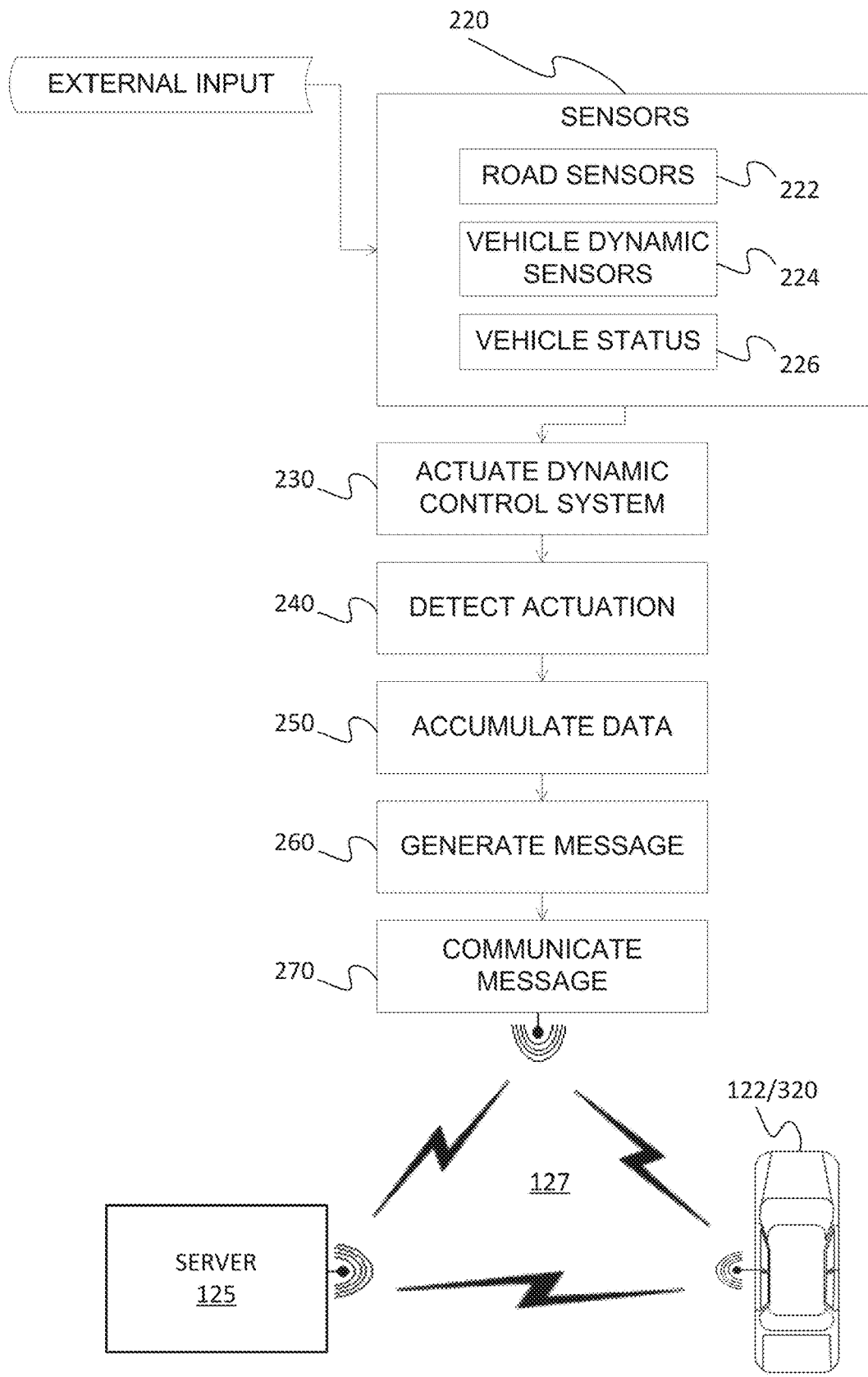
FIG. 2 illustrates another flow chart of an example embodiment for dangerous driving event notification.

FIG. 2 illustrates an example embodiment for dangerous driving event notification. As presented in the following sections, the acts may be performed using any combination of the components indicated in FIG. 4, FIG. 5A, FIG. 5B, or FIG. 6. For example the term controller may refer to either controller 200 of or processor 300 and the following acts may be performed by mobile device 122, server 125, or a combination thereof. Additional, different, or fewer acts may be provided. The acts are performed in the order shown or other orders. The acts may also be repeated.

In act 220, sensors may detect external input to a vehicle. The external input may be related to an object in a roadway, a condition or characteristic of a roadway, weather conditions, or any other external input that may related to the operation of a vehicle.

Any sensors may be used to detect or determine the external input. For example, road sensors 222, vehicle dynamic sensors 224, or vehicle status indicators 226 may be sensors used to detect an external input. Vehicle dynamic sensors 224 may be any sensor integrated or otherwise associated with a vehicle intended to detect, measure, or quantify the dynamic operation of a vehicle. Examples of vehicle dynamic sensors may be seen with reference to the various vehicle sensors described with respect to FIG. 5B.

Road sensors 222 may be any device integrated or otherwise associated with a vehicle and/or system configured to detect, measure, represent, or quantify characteristics of a roadway. Characteristics of a roadway may include geometrical characteristics such as curvature, slope, or bank angle, road surface characteristics such as surface type or condition, weather conditions such as precipitation existence or temperature, or any other roadway characteristics. An example of road sensors 222 may be seen with reference to the proximity indicator 352 of FIG. 5B.

Vehicle status indicators may be any indicator that provides information relating to a status of a vehicle or a system of a vehicle. For example, a status indicator may be the power status of a component such as a windshield wiper. A powered windshield wiper may indicate that the windshield wipers are on. Further, headlighting systems, window systems, internal environmental control systems, entertainment systems, as well as any other vehicular system, may provide status indicators of the particular components of the systems. Status indicators may exist as electronic data. For example, a controller or processor coupled with a vehicle may serve to monitor the status of systems and maintain data indicative of the status of those systems. Further, the vehicle processor may control the manipulation of the status of vehicular systems. Vehicle status indicators may be read or derived from the data used or produced by the vehicle processor.

In act 230, a dynamic control system of a vehicle may be actuated in response to the external input. The dynamic control system operates to control or manipulate an operational motion of a vehicle along a roadway. For example, a dynamic control system may actuate braking, steering, and/or throttle systems in the control of a vehicle. In an embodiment, a dynamic control system is an electronic stability control system integrated with a vehicle, such as the electronic stability control system described below with respect to FIG. 5B. An actuation of the dynamic control system in response to an external input may be considered an event or a dangerous event.

In act 240, the actuation of the dynamic control system is detected. The actuation may be detected using any technique. In an embodiment, the dynamic control system may communicate a signal with the vehicle indicating that a dynamic event has occurred. This signal may be intercepted or otherwise received and interpreted to detect an actuation of the dynamic control system. In an embodiment, an actuation may be detected directly from the affected vehicle systems. For example, a powered hydraulic brake actuation may be detected as a pressure rise in a component in a braking system.

In act 250, data may be accumulated that relates to the actuation of the dynamic control system. The information may be any information relating to a status or operation of a vehicle before, during, and/or after an event. In an embodiment, information indicating a position of an occurrence of an event, a time of an occurrence of an event, and/or a type of event that occurred may be accumulated. Information indicating a time of the actuation may also be accumulated.

Information relating to a position or location of the vehicle at the time of the actuation of the dynamic control system may also be accumulated. The location information may be in any format. For example, a location may be designated using a specific pairing of latitude and longitude in a Cartesian coordinate grid in a spherical coordinate system, an ellipsoid-based system such as the World Geodetic System, or any other system operational to describe an absolute or relative location of the vehicle. In an embodiment, a location may be designated as a segment of a road or a polytonally defined geographic area such that the location does not designate a specific location, but instead designates a defined area.

Other information, such as vehicle status information or road characteristics may also be accumulated. The other information may be associated with a time before, during, or after an event. In an embodiment, the other information involves information associated with a time immediately prior to the event.

In an embodiment, other information may involve vehicle status information such as a transmission mode of a vehicle, a windshield wiper mode of a vehicle, a headlight mode of a vehicle, an external temperature of a vehicle, and or a vehicle density of an area, such as 30 meters, around a vehicle.

A vehicle density may be considered a course measure of a number of vehicles or moving objects surrounding a vehicle within a certain range of the vehicle. In an embodiment, vehicle density may be determined using a proximity indicator 352 such as a camera as is described with respect to FIG. 5B.

In an embodiment, other information may have multiple categories or modes. For example, a windshield wiper mode may involve several modes, such as off, slow, fast or intermittent. Likewise, a transmission mode may involve multiple modes such as drive, park, neutral, or a specific gearing for the transmission. Also, a headlight mode may indicate low-beams or high beams as well as an off mode. Any of the modes may be accumulated.

In an embodiment, other information may involve road characteristics or attributes. For example, lane curvature, road type, a road gradient, number of lanes, and/or the existence of road shoulders or elevated structures such as curbing may be included as road characteristics. Road characteristics may involve lane characteristics. For example, lane characteristics may involve a lane the vehicle is in, an angle to a lane marker, a curvature of a marker, and/or a position relative to a lane marker. Also, lane or other road markings and structures such as curbs may be used to determine a vehicle position on a roadway. For example, the specific lane and/or position within a lane may be defined by a measure of the distance from a marker or a structure. Angles of the vehicle relative to markers may also be determined. Further, curvature of the roadway may also be determined from markers. Also, a functional class for a lane or road may be determined. These measurements may be made using data accumulated by a proximity indicator 352 such as a camera as is described with respect to FIG. 5B. Cameras may be positioned in the front, rear, left, right, or any other position relative to a vehicle so as to appropriately describe the area around the vehicle.

In an embodiment, other information may involve dynamic data of the vehicle. Any dynamic data relating to the motion of the vehicle may be other information. For example, dynamic data may involve indicating a longitudinal acceleration of the vehicle, a lateral acceleration of the vehicle, a yaw rate of the vehicle, a steering angle of the vehicle, and/or a vehicle speed.

Times or time stamps may be included with the accumulated other information. The time stamps may involve an absolute time, or a time relative to an event or dynamic control system actuation.

In act 260, a notification message of the automotive dynamic control actuation event is generated. The message may involve all or some of the data accumulated in act 250. For example, the message may include an event type for the automotive dynamic control event, a time of occurrence of the automotive dynamic control event, and a location of the automotive dynamic control event. Other information may also be included in the message.

The notification message may also be formatted in a specific manner. For example, the message may include a header and a body. Further, the header may contain specific information and the body may involve other specific information. For example, the header may include a time of occurrence of the event and a location for the event, while the body may include an event type. The event type may be chosen from a plurality of event types for the event. The header and body may also contain other accumulated information as well. In an embodiment, information that may be useful to a recipient for interpretation of the message may be included in the header. For example, indicators of a vehicle manufacturer or a standardized message format may be included in the header. This information may be used to configure the interpretation of the message by the recipient. For example, a manufacturer may use specific types of units for the values being reported in the message. A recipient knowing the manufacturer may then be able to interpret the values of the message as being indicated in particular units. Also, in an embodiment, a vehicle may receive a notification message and analyze the header of the notification message for location data. If the location data indicates that the location of the dangerous event is not within a concerned proximity to the receiving vehicle, the message may be disregarded. Alternatively, the message may be stored by the receiving vehicle until an intended path of the receiving vehicle indicates that the receiving vehicle will be in the proximity of the dangerous driving event location. At that time the message may be analyzed further.

Other information such as a vehicle identification or a severity rating for the event may also be included in the header. A severity may be a function of the magnitude and duration of a dangerous driving event as determined from sensor readings. The severity may be normalized across different senor readings, and combinations thereof, such that a standard scale may be used to represent severities of different events and event types. For example, the values may be normalized to a 1-10 scale with 1 indicating a lowest severity and 10 indicating a highest severity.

In an embodiment, a notification message may include an identifier such as an individual code that identifies the specific notification message among a group of similarly constructed and/or formatted notification messages. The code may be formatted such that particular positions of the code represent different data. For example, the first six characters may indicate a time or timestamp of an event, and the next four characters may represent a location of the event, and the next five characters may be considered an indicator of a specific dynamic event or event type. Other data may also be included in the code, and the code may be combined with other data in a message. For example, characters identifying a specific message may be included in the code. In an embodiment, a code may be the notification message. In such an embodiment, the first six characters of the timestamp and the next four characters of the location may be considered a message header, and everything after, including five characters identifying the event or event type, may be the body of the notification message. In another embodiment, an individual code for a message is included as one part of a larger message.

In act 270, the notification message is communicated. The message may be communicated to any recipient and by any technique. For example, the notification message may be transmitted to a vehicle 320, mobile device 122, and/or server 125 via a network 127.

The message may also be communicated from the server 125 to any number of vehicles 320 or mobile devices 122. Further, the server 125 may further act to receive notification messages in any format, manipulate the messages such that they are in a different format, and transmit the messages in the different format to the mobile devices 122 and/or vehicles 320. The different format may be a standardized or universal format configured to be comprehensible by multiple types of communication systems used by the mobile devices 122 and vehicles 320.

In an embodiment, multiple notification messages may be aggregated and analyzed to determine further information that may be related to dangerous situations. For example, the server 125 may aggregate a plurality of notification messages and determine that a particular vehicle is generating multiple notification messages, and determine that the particular vehicle is a dangerous vehicle. In another example, the server 125 may aggregate a plurality of notification messages and determine that multiple messages are generated for a same or similar location. This location may be determined to be a dangerous location. The server 125 may then transmit a message to vehicles within a proximity of the dangerous location or dangerous vehicle to warn of the dangerous conditions.

Any information or data in the message may be used to aggregate and any aggregating method may be used. For example, a collection of messages may be analyzed to find and/or group messages with similar data. Groups of messages may be generated on any available data. For example, messages may be grouped based on time range, geographic location or area, availability of various types of data, or any other data included in messages. Messages with similar events or event types may be grouped and the data of the messages may be analyzed for similarities. For example, emergency stop events may be grouped, and it may be determined that many of the emergency stop event messages indicated that the vehicles were operating in a low visibility environment. In another example, a collection of messages from a particular location may be grouped, and it may be determined that many of the messages from the location were generated at a particular time of day. This may indicate that the location is more dangerous at particular times of day.

Figure 3A:
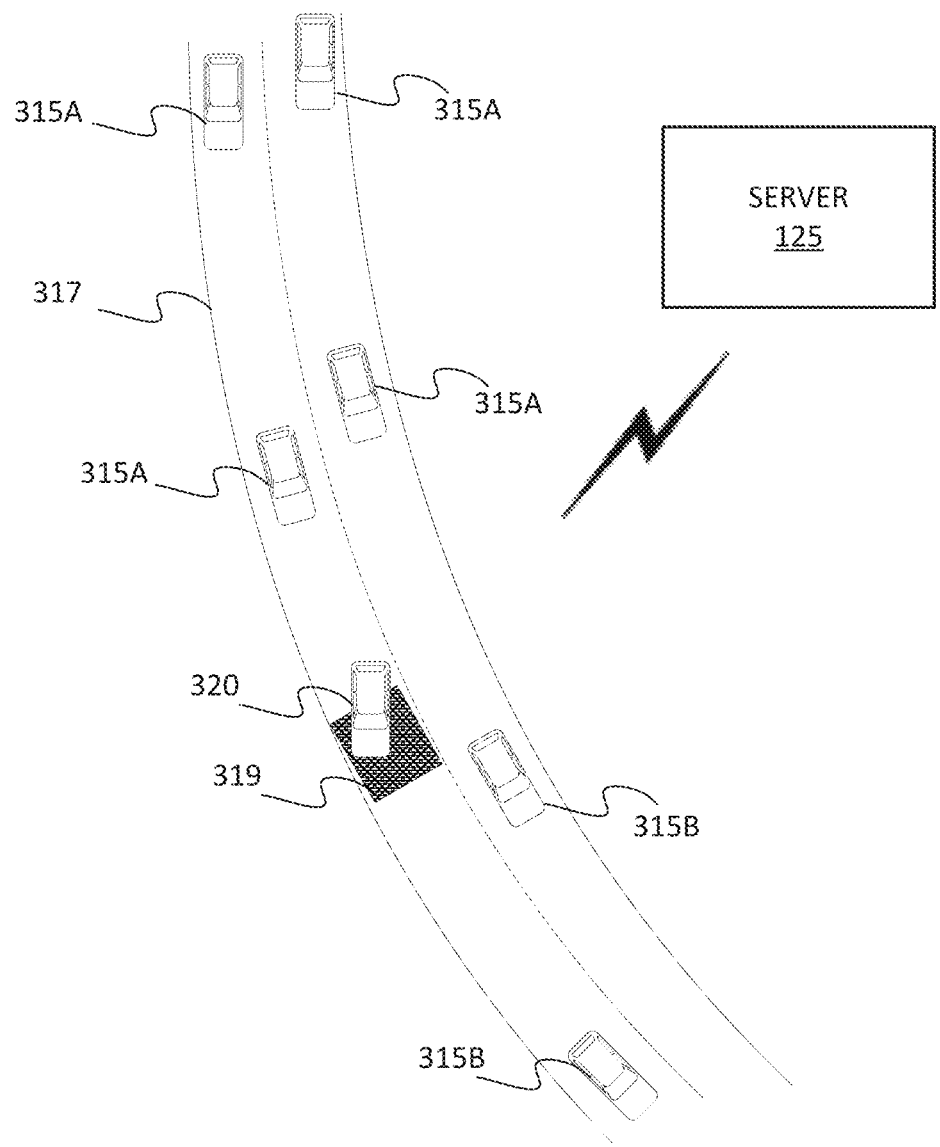
FIG. 3A illustrates an exemplary diagram of a dangerous driving event.

FIG. 3A illustrates a roadway 317 with multiple vehicles 315A, 315B, 320. The vehicles may be in communication with a server 125. The roadway may be primarily surfaced with asphalt, however, a particular section 319 of the roadway 317 may be surfaced with loose gravel. One of the vehicles 320 may approach a section 319 of the roadway 317 and may begin to rotate such that a yaw rate sensor of the vehicle 320 indicates an excessive yaw rate for the vehicle 320. A dynamic control system may actuate in response to the indication of an excessive yaw rate and perform a yaw rate mitigation. The yaw rate mitigation event may then be detected by a system of the vehicle 320 and a message may be generated including a location of the event, an event type, and other information relating to data collected by sensors of the vehicle 320 so as to appropriately characterize or describe the event. The message may be transmitted to the server 125. The server may then determine vehicles that may be impacted by the yaw rate mitigation event 315A, and transmit the message to those vehicles 315A. The server may also determine that other vehicles 315B will not be impacted by the event, and not transmit the message to the other vehicles 315B. Direction of travel may be taken into account, and in roadways having bi-directional traffic, the message may be transmitted to vehicles traveling toward the location of the event, from either direction. Alternatively, the server 125 may communicate the message to all vehicles in communication with the server 125, or all vehicles on the roadway 317. Further, the server 125 may transmit the message to vehicles traveling on the roadway 317.

The message may be a message 360 as displayed in FIG. 3B. The message may involve a header 362 and a body 363, as well as other categories or sections of information 364, 365, 366, 367. The categories may involve a vehicle mode 364 category of data, a road attribute 365 category of data, a vehicle dynamics 366 category of data, and an event characteristics 367 category of data. Also, the data may relate to any time before, during, or after the event so as to appropriately characterize the event. In an embodiment, values associated with times immediately prior or after the event may be included. For example, the message may involve road attribute data 365 and vehicle dynamic data 366 may involve data acquired immediately prior to the event and during the event. Data acquired immediately prior or immediately subsequent may be data with the next closest time value or time stamp to a time determined for the event.

Figure 4:
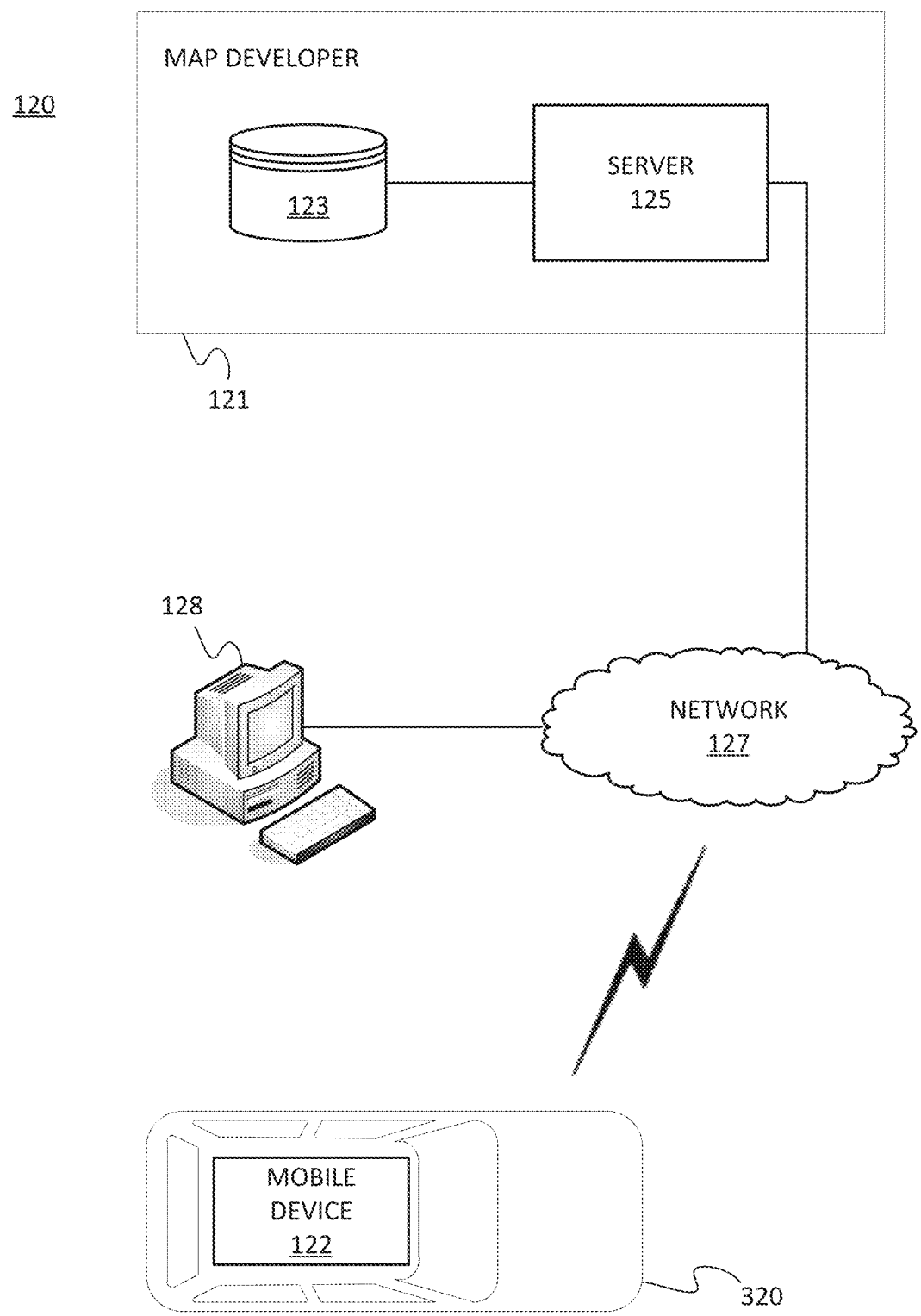
FIG. 4 illustrates an exemplary system for dangerous driving event notification.

FIG. 4 illustrates an exemplary system 120 for reporting dangerous driving events. The system 120 may include a developer system 121, a mobile device 122, and a network 127. The mobile device 122 may be associated, coupled, or otherwise integrated with a vehicle 320. Additional, different, or fewer components may be provided. For example, many mobile devices 122 may connect with the network 127.

The developer system 121 includes a server 125 and a database 123. The developer system 121 may include computer systems and networks of a system operator such as HERE or NOKIA Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for traffic, navigation, and/or assisted or automated driving related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may also include locations of dangerous driving events derived from notification messages, as well as dangerous locations and dangerous vehicles determined from notification messages of dangerous driving events.

The mobile device 122 may include one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122. The mobile device 122 may also include a system for tracking mobile device movement, such as rotation, velocity, or acceleration. Movement information may also be determined using the positioning system. The mobile device 122 may use the detectors and sensors to provide data indicating a location of a vehicle.

The mobile device 122 may communicate location and movement information via the network 127 to the server 125. The server 125 may use the location and movement information received from the mobile device 122 to associate the mobile device 122 with a geographic region, or a road of a geographic region, described in the geographic database 123. Server 125 may also associate the mobile device 122 with a geographic region, or a road of a geographic region, manually.

The server 125 may receive location and movement information from multiple mobile devices 122 over the network 127. The location and movement information may be in the form of mobile device data. The server 124 may compare the mobile device data with data of a road system stored in the database 123. In this way, the positions of vehicles associated with the mobile devices 122 may be determined relative to a road network.

The computing resources for dangerous driving event notification may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122. For example, data may be collected by the mobile device 122 and a notification message may be generated by the server 125.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5A:
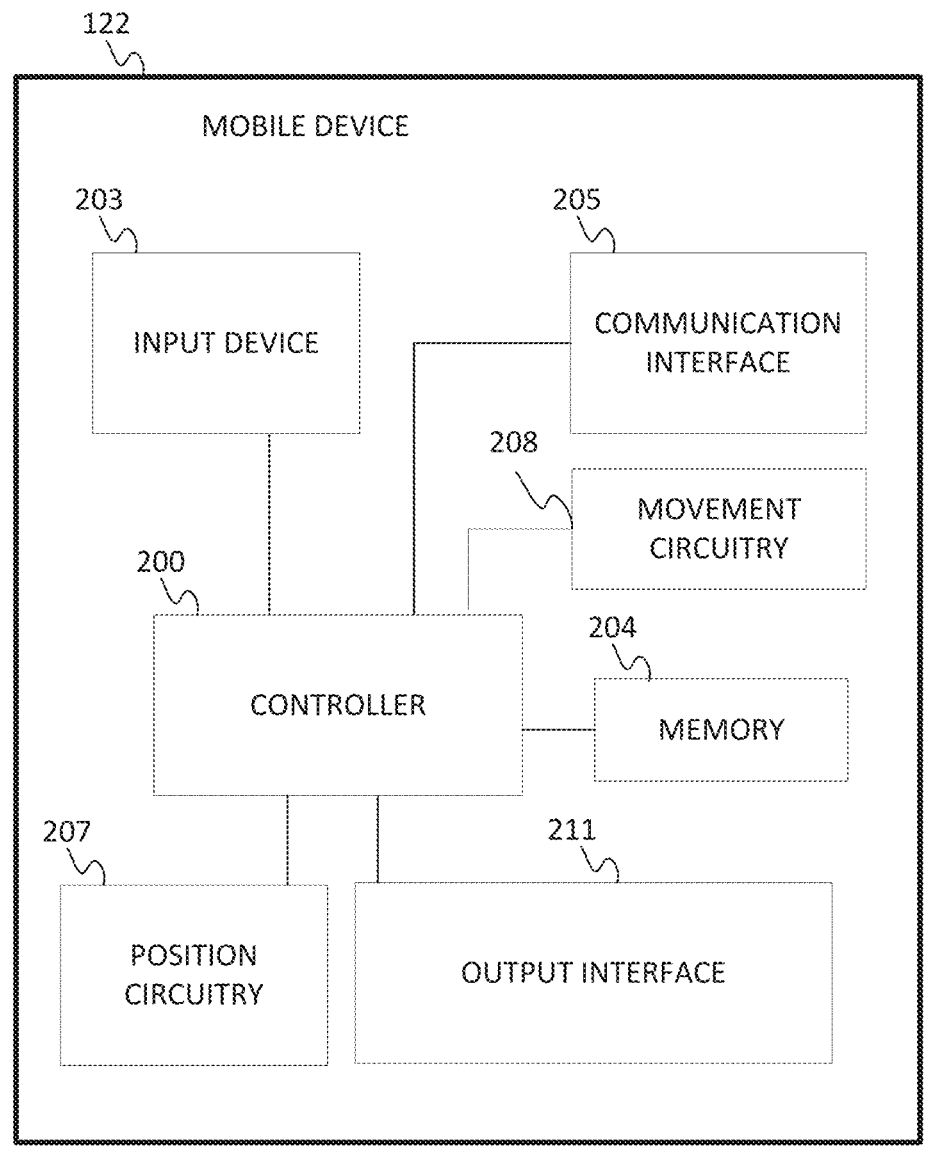
FIG. 5A illustrates an exemplary mobile device of the system of FIG. 4.

FIG. 5A illustrates an exemplary mobile device of the system of FIG. 4. The mobile device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, an assisted driving device, an automated driving or control device, and/or any other known or later developed mobile device. The positioning circuitry 207, which is an example of a positioning system, is configured to determine a geographic position of the mobile device 122. The movement circuitry 208, which is an example a movement tracking system, is configured to determine movement of a mobile device 122 but may operate in place of, or in correlation with, other movement sensors and/or circuitry integrated with a vehicle associated with the mobile device 122. The position circuitry 207 and the movement circuitry 208 may be separate systems, segments of the same positioning or movement circuitry system, or integrated systems of a vehicle associated or otherwise integrated with the mobile device. In an embodiment, components as described herein with respect to the mobile device 122 may be implemented as a vehicle.

In an embodiment, the memory 204 may include computer program code, configured to be executed by the controller 200 to cause the mobile device 122 to detect an occurrence of an automotive dynamic control event initiated by the dynamic control system, generate a notification message of the automotive dynamic control event, the notification message involving an event type for the automotive dynamic control event, a time of occurrence of the automotive dynamic control event, and a location of the automotive dynamic control event, and communicate the notification message to vehicles within a specified range of the mobile device 122.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122 or a vehicle associated with the mobile device 122.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine mobile device 122 movement.

Positioning and movement data obtained from a mobile device may be considered geographic data, device data, other data, and/or mobile device data.

The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers. In an embodiment, the output interface 211 is operational to display notification message to an operator of a vehicle.

The communication interface 205 is configured to send data such as mobile device movement and position data to a server 125. The position circuitry 207 is configured to determine the current location of the mobile device. The communication interface 205 may also be configured to communicate notification messages of dangerous driving events to the server 125.

Figure 5B:
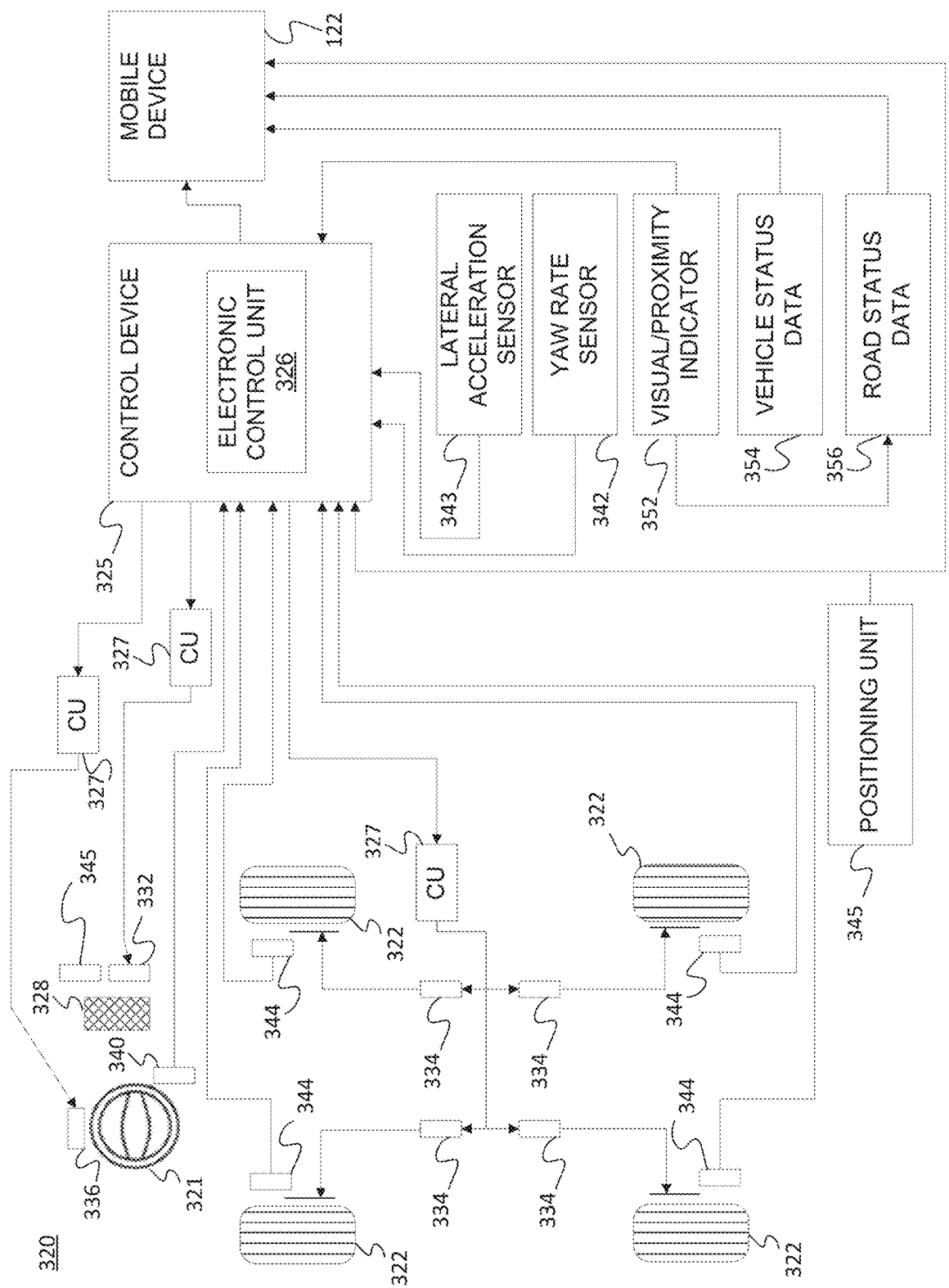
FIG. 5B illustrates an exemplary vehicle coupled with a mobile device of the system of FIG. 4.

FIG. 5B shows a diagram of a vehicle 320 that includes an embodiment of a dynamic control device or Electronic Stability Control (ESC) system 325 coupled with a mobile device 122. In another embodiment, the mobile device 122 may share components or otherwise be integrated with the ESC system 325 such that the mobile device 122 and the ESC system 325 are considered a single system. In another embodiment, the vehicle 320 may be considered a mobile device. The ESC system 325 includes sensors that monitor certain vehicle operations, an ESC program that receives inputs from the sensors and determines modifications for the vehicle operation and outputs commands to actuators that apply the modifications.

More specifically, included among the sensors of the ESC system 325 is a steering wheel sensor 340. The steering wheel sensor 340 determines the position (i.e., angle) of the vehicle steering wheel 321 and outputs a signal on a continuous or regular basis indicating the steering wheel position.

Also, included among the sensors of the ESC system 325 is a yaw rate sensor 342. Yaw is movement or rotation around a yaw (i.e. vertical) axis of a rigid body that changes the direction the body is pointing, to the left or right of the body's direction of motion. Yaw rate is the angular velocity of this rotation, or rate of change of the heading angle when the body is horizontal. The yaw rate sensor 342 is located within the vehicle 320. The yaw rate sensor 342 measures the yaw rate of the vehicle 320 and provides an output signal indicative thereof. The yaw rate sensor 342 provides a signal indicating the vehicle yaw rate on a regular and/or continuous basis.

The ESC sensors also include wheel sensors 344. The wheel sensors 344 measure the speed (i.e., rotation) of each individual wheel 322 respectively. Each wheel sensor provides an output signal indicating the respective wheel speed. The wheel sensors 344 provide output signals indicating the respective wheel speeds on a continuous and/or regular basis.

The ESC sensors also include a lateral acceleration sensor 343. The lateral acceleration sensor 343 is located within the vehicle 320. The lateral acceleration sensor 343 measures the lateral acceleration of the vehicle 320 and provides an output signal indicative thereof. The lateral acceleration sensor 343 provides a signal indicating the vehicle's lateral acceleration on a regular and/or continuous basis.

The ESC sensors also include a throttle sensor 345. The throttle sensor 345 measures the position and/or operation of the vehicle throttle 328. The throttle sensor 345 provides an output signal indicating the throttle position and/or operation on a continuous and/or regular basis.

The ESC system 325 includes an electronic control unit (ECU) 326. The electronic control unit 326 may be a microprocessor or other computer hardware device capable of being programmed with software, firmware or otherwise. The electronic control unit 326 may meet standard specifications for use and operation in vehicles.

The electronic control unit may be an application-specific integrated circuit ("ASIC"), digital signal processor, field programmable gate array ("FPGA"), digital circuit, analog circuit, a general processor, or combinations thereof. In one embodiment, the processor is one or more processors operable to control and/or communicate with the various electronics and logic of the associated components or devices.

The electronic control unit 326 runs an electronic stability control application. The electronic stability control application is a program implemented in software or firmware. The electronic stability control application executes program instructions to carry out the functions of the Electronic Stability Control system, as explained herein. The electronic stability control application receives the signal inputs from the Electronic Stability Control system sensors. More specifically, the electronic stability control application receives the signal outputs from the steering wheel sensor 340, the yaw rate sensor 342, the wheel sensors 344, the lateral acceleration sensor 343, and the throttle sensor 345.

The vehicle 320 may also include a sensor, or sensors configured to determine and characterize objects within a vicinity of the vehicle 320. For example, the vehicle 320 may include proximity indicators or sensors 352 configured to detect the presence of nearby objects without any physical contact. The proximity indicator or sensor may operate using electromagnetic fields or beams of electromagnetic radiation, such as infrared radiation, and detect changes in returned or reflected fields or beams to determine proximate objects. Other techniques, such as capacitive, photoelectric, or inductive techniques, may be used. In an embodiment, a proximity indicator includes a camera, or a set of cameras, configured to capture images or video of a surrounding visible area of the vehicle 320. Objects in the path or otherwise obstructing a vicinity of the vehicle 320, as well as road characteristics such as curves and embankments, may be determined from an analysis of the images or video performed by the control device 325 or the mobile device 122. In an embodiment, the control device 325 may use objects or road characteristics as inputs to the electronic control unit 326.

The ESC system 325 may not necessarily include all the types of sensors indicated above. Alternatively, the ESC system 325 may include different sensors than those mentioned above, or may include other sensors in addition to those indicated above.

The ESC system 325 includes actuators that carry out the commands determined by the ESC application to modify operation of certain vehicle systems. As determined by the electronic stability control application, the ECU 326 provides signals to one or more control units 327. The control units 327 may operate electrically, hydraulically, or by any other technique operational to control vehicular dynamic control parameters. A control unit 327 may control operation of an actuator 332 associated with the vehicle throttle 328.

A control unit 327 may control an actuator 336 configured to control the position and movement of a steering wheel or steering system of a vehicle. The control unit 158 controls the operation of actuators 334 each of which is associated with a brake associated with one of the respective wheels 322. By means of these actuators, the ESC system 325 can actuate wheel brake forces as well as engine throttle to affect the dynamics (i.e., operation and movement) of the vehicle 320. The sensing of environmental factors or the actuation of a control unit 327 or other dynamic controlling device may be considered an event. These events may be categorized based on the type of control actuated, or the type of input causing actuation. For example, a change in a frictional coefficient of a road surface may cause a wheel to loose traction and thus slip relative to the road surface. This slip may be detected by the wheel speed sensors 344, and categorized as a wheel slip event. A control unit may 327 may be actuated to initiate a dynamic control event due to the wheel slip event.

The occurrence of an event may be communicated from the control device 325 to the mobile device 122. The communication of the event may include date and location data of the event, or the date and location data may be gathered independent of the control device 325. Other data may also be gathered by the mobile device 122 relating to the vehicle at the time of the communicated event. For example, other data may be gathered by the mobile device 122 from vehicle status data 354 collected from various systems of the vehicle 320, as well as road status data 356 determined from the visual indicator 352, and a positioning system 345 associated with the vehicle 320. Other data may also include dynamic data of the vehicle 320. The dynamic data may be dynamic data determined from various dynamic sensors of the vehicle 320 such as the lateral acceleration sensor 343, the yaw rate sensor 342, the wheel speed sensors 344, the steering angle sensor 340, the throttle sensor 345, or any other dynamic senor of the vehicle 320 configured to provide data to the control device 325. The dynamic data may be data collected prior to an event, during an event, after an event, or any combination of timing around an event. In an embodiment, other data includes dynamic data acquired immediately before and during an event.

Vehicle status data 354 may be provided by any system of the vehicle 320. For example, the vehicle status data 354 may be provided by a system in control of the vehicle windshield wipers or headlights. Such a system may provide vehicle status data 354 that indicates the status of the windshield wipers at the time of the event, such as "on", "off", or "intermittent" at a certain interval. A system may also provide the status of the headlights at the time of the event, such as "on", "off", "high-beam", or "low-beam". Any other vehicle system may also provide vehicle status data.

Road status data 356 may be determined from the proximity indicator 352. For example, the proximity indicator 352 may be a camera configured to capture images which may provide data to determine road characteristics such as curve characteristics, embankment, slope, road surface characteristics such as asphalt or other pavement materials, as well as road boundary characteristics such as curb existence or shoulder configuration, of the road the vehicle 320 was on at the time of an event. In an embodiment, the road status data 356 is determined by the mobile device 122 using data communicated from the proximity indicator 352.

The positioning system 345 includes hardware and software that determines the position of the vehicle 320 on the road network. The position may be the position of the vehicle 320 at the time of an event. The positioning system 345 may include a Global Navigation Satellite System (GNSS) unit (such as GPS, Galileo, Glonass or Compass) and/or other positioning hardware, such as inertial sensors including gyros, accelerometers and inclinometers. The positioning system 345 may also include the wheel speed sensors 344. The positioning system 345 also may include a positioning application. The positioning application is a software routine or program that uses information output by the positioning hardware and a map database of a geographic area. The positioning application may determine a two or three dimensional position, velocity and direction of the vehicle along a road segment. The positioning application may be installed, run or executed on the same electronic control unit 326 as the Electronic Stability Control application, or alternatively, the positioning application may be installed, run or executed on a separate processor, for example on the mobile device 122 coupled with the vehicle 320. In an embodiment, the positioning unit 345 may communicate the position of the vehicle 320 at the time of an event to the mobile device 122.

Figure 6:
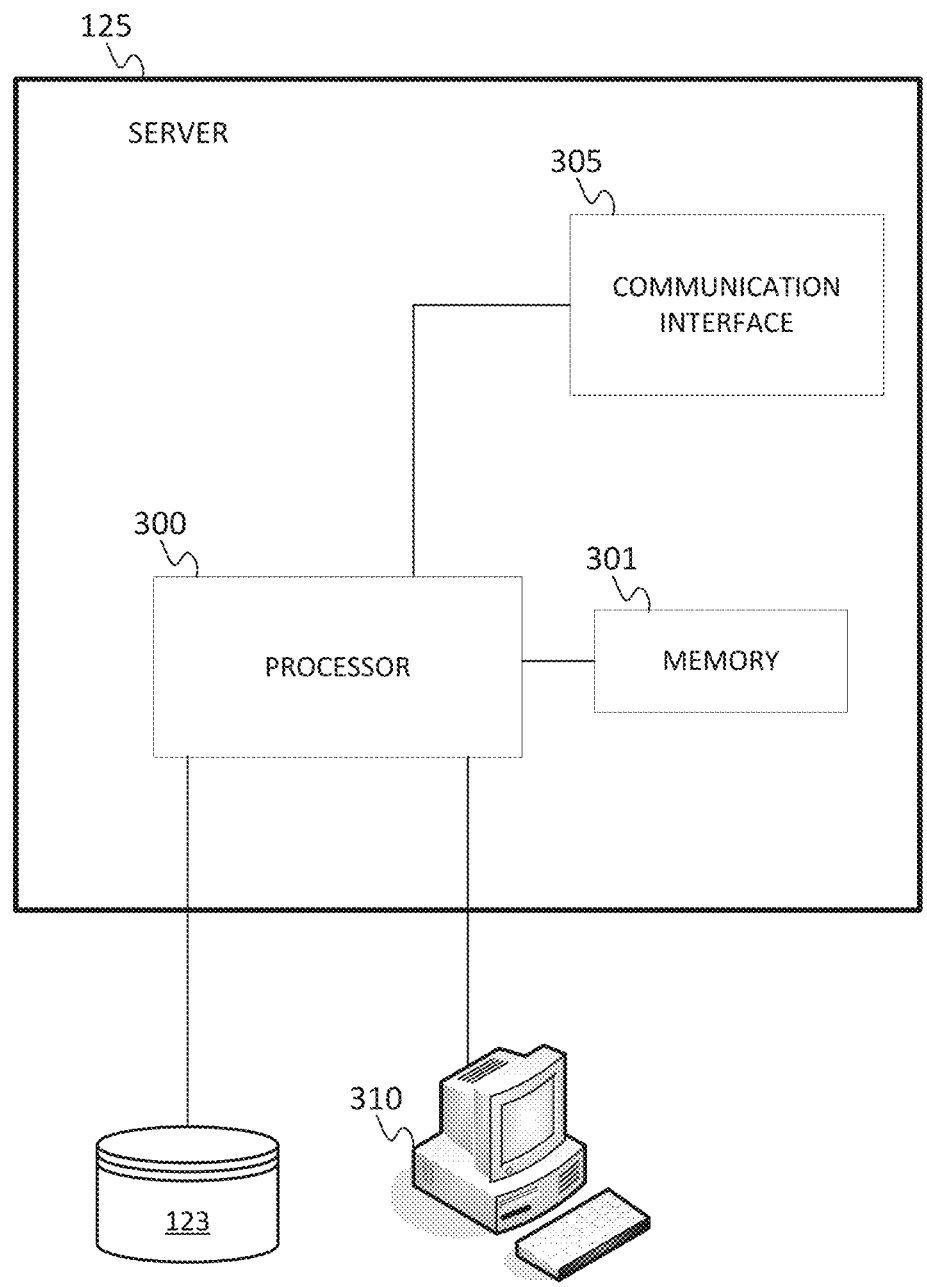
FIG. 6 illustrates an exemplary server of the system of FIG. 4.

FIG. 6 illustrates an exemplary server of the geographic or navigation system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 may receive data indicative of inputs made via the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a)hardware-only circuit implementations (such as implementations in only analog and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
receiving an indication of detection, by a vehicle sensor, of an occurrence of a dangerous event relating to the operation of a vehicle;
receiving at a processor, a notification message of the occurrence of the dangerous event relating to the operation of the vehicle, the notification message comprising a header and a body, wherein the header comprises a timestamp, a location, an identification, and a severity rating of the dangerous event, wherein the body comprises, a path, path event data, and vehicle meta data, wherein the path comprises a plurality of position estimates, wherein the path event data comprises road attribute data and data that describes the dangerous event, and wherein the dangerous event relating to the operation of the vehicle is an automotive electronic stability control event initiated by an electronic stability control system of the vehicle autonomously without a driver's intervention;
aggregating the notification message with other collected notification messages indicating occurrences of dangerous events relating to the operation of vehicles, each collected notification message including a vehicle original equipment manufacturer and vehicle meta data;

transmitting a notification message wherein the notification message comprises path event data from before the dangerous event and after the dangerous event, wherein the header provides limited information sufficient for a recipient to accept the notification message as relevant or discard the notification message as irrelevant; and enabling a recipient to accept the information in response to the location identified in the header being within a predetermined distance from the recipient, and to discard the notification message in response to the location identified in the header being outside of a predetermined distance from the recipient.

2. The method of claim 1, further comprising:
determining a dangerous location based on data of the plurality of collected notification messages.

3. The method of claim 1, further comprising:
determining a dangerous vehicle based on data of the plurality of collected notification messages.

4. The method of claim 1, wherein the notification message is communicated to vehicles within a specified distance of the location of the occurrence of the dangerous event relating to the operation of the vehicle.

5. The method of claim 1, wherein the path event data further comprises vehicle dynamic data.

6. The method of claim 5, wherein the vehicle dynamic data includes vehicle speed data and vehicle yaw rate data.

7. The method of claim 1, wherein the path event data further comprises lane data.

8. The method of claim 7, wherein the lane data includes lane position data, lane curvature data, and lane type data.

9. The method of claim 1, wherein the path event data further comprises environmental status data.

10. The method of claim 9, wherein the environmental status data includes visibility data.

11. The method of claim 1, wherein the path event data further comprises object detection data.

12. The method of claim 11, wherein the object detection data includes an object identifier, object type data, object position data, and object size data.

13. The method of claim 1, wherein the path event data further comprises autonomous vehicle sensor and service state data.

14. An apparatus comprising:
at least one processor; and
at least one memory including computer program code, the at least one memory and the computer program code configured to, with the at least one processor, cause the apparatus at least to:
receive an indication of detection of an occurrence of an automotive dynamic control event initiated by a dynamic control system of a vehicle;
receive a notification message of the automotive dynamic control event, the notification message comprising a header and a body, wherein the header comprises a timestamp, a location, an identification, and a severity rating of the dangerous event, wherein the body comprises a path, path event data, and vehicle meta data, wherein the path comprises a plurality of position estimates, wherein the path event data comprises data that describes the automotive electronic stability control event initiated by an electronic stability control system of the vehicle autonomously without a driver's intervention;
aggregate the notification message with other collected notification messages indicating occurrences of dangerous events relating to the operation of vehicles, each collected notification message including a vehicle original equipment manufacturer and vehicle meta data;
communicate a notification message wherein the notification message comprises path event data from before the dangerous event and after the dangerous event, wherein the header provides limited information sufficient for a recipient to accept the notification message as relevant or discard the notification message as irrelevant; and
enable a recipient to accept the information in response to the location identified in the header being within a predetermined distance from the recipient, and to discard the notification message in response to the location identified in the header being outside of a predetermined distance from the recipient.

15. A non-transitory computer readable medium including instructions that when executed on a computer are operable to:
receive an indication of detection, from a vehicle sensor, of an occurrence of a dangerous event relating to the operation of a vehicle;
receive a notification message of the dangerous event comprising a header and a body, wherein the header comprises a timestamp, a location, an identification, and a severity rating of the dangerous event, wherein the body comprises a path, path event data, and vehicle meta data, wherein the path comprises a plurality of position estimates, wherein the path event data comprises road attribute data and data that describes the dangerous event, and wherein the dangerous event relating to the operation of the vehicle is an automotive electronic stability control event initiated by an electronic stability control system of the vehicle autonomously without a driver's intervention;
aggregate the notification message with other collected notification messages indicating occurrences of dangerous events relating to the operation of vehicles, each collected notification message including a vehicle original equipment manufacturer and vehicle meta data;
transmit a notification message wherein the notification message comprises path event data from before the dangerous event and after the dangerous event, wherein the header provides limited information sufficient for a recipient to accept the notification message as relevant or discard the notification message as irrelevant; and
enable a recipient to accept the information in response to the location identified in the header being within a predetermined distance from the recipient, and to discard the notification message in response to the location identified in the header being outside of a predetermined distance from the recipient.

* * * * *